(12) United States Patent
Pesonen et al.

(10) Patent No.: US 12,331,835 B2
(45) Date of Patent: Jun. 17, 2025

(54) METHOD AND ARRANGEMENT FOR WASHER SEAL CONTROL

(71) Applicant: ANDRITZ OY, Helsinki (FI)

(72) Inventors: Mikko Pesonen, Savonlinna (FI);
Jarkko Hytönen, Savonlinna (FI);
Simo Karjalainen, Savonlinna (FI);
Harri Qvintus, Savonlinna (FI)

(73) Assignee: ANDRITZ OY, Helsinki (FI)

( * ) Notice: Subject to any disclaimer, the term of this patent is extended or adjusted under 35 U.S.C. 154(b) by 315 days.

(21) Appl. No.: 18/020,886

(22) PCT Filed: Aug. 6, 2021

(86) PCT No.: PCT/FI2021/050545
§ 371 (c)(1),
(2) Date: Feb. 10, 2023

(87) PCT Pub. No.: WO2022/034263
PCT Pub. Date: Feb. 17, 2022

(65) Prior Publication Data
US 2023/0304582 A1 Sep. 28, 2023

(30) Foreign Application Priority Data
Aug. 10, 2020 (FI) ...................................... 20205788

(51) Int. Cl.
*F16J 15/3296* (2016.01)
*D21C 9/02* (2006.01)
*D21C 9/06* (2006.01)

(52) U.S. Cl.
CPC ............ *F16J 15/3296* (2013.01); *D21C 9/02* (2013.01); *D21C 9/06* (2013.01)

(58) Field of Classification Search
CPC ........ F16J 15/326; F16J 15/3296; D21C 9/02; D21C 9/06
See application file for complete search history.

(56) References Cited

U.S. PATENT DOCUMENTS

| 8,303,770 B2 | 11/2012 | Orgård | |
|---|---|---|---|
| 2009/0078382 A1* | 3/2009 | Mattsson | D21C 9/06 162/254 |
| 2017/0059042 A1* | 3/2017 | Withers | F16J 15/3296 |

FOREIGN PATENT DOCUMENTS

| CN | 205295801 U | 6/2016 |
| CN | 110004758 A | 7/2019 |

(Continued)

OTHER PUBLICATIONS

Kopra Riku, Brown Stock Washing Optimization and Research Stidoes Field Results, undated (downloaded online Feb. 7, 2025. (Year: 2025).*

(Continued)

*Primary Examiner* — Anthony Calandra
(74) *Attorney, Agent, or Firm* — Nixon & Vanderhye P.C.

(57) ABSTRACT

An arrangement for measuring the distance between at least one seal bar (20) and a rotating drum (10) of a drum displacement washer, including at least one sensor element (30) positioned inside the rotating drum (10) and configured to provide a signal indicative of the distance between the outer surface of the rotating drum (10) and the at least one seal bar (20); and a signal transfer element (50) configured to transfer the signal outside the rotating drum (10).

6 Claims, 5 Drawing Sheets

(56) References Cited

FOREIGN PATENT DOCUMENTS

| | | | | |
|---|---|---|---|---|
| EP | 2 557 339 | 2/2013 | | |
| EP | 3903922 A1 | * 11/2021 | ........... | A23G 3/0095 |
| WO | 97/10380 | 3/1997 | | |
| WO | 2006/130110 | 12/2006 | | |
| WO | 2009/135987 | 11/2009 | | |
| WO | 2020/089653 | 5/2020 | | |

OTHER PUBLICATIONS

Andritz, DD-Washer plus, Aug. 2023, Andritz. (Year: 2023).*
CN Office Action with English Translation cited in Application No. 202180056256.2, mailed Aug. 24, 2023, 20 pages.
International Search Report dated Nov. 15, 2021, for PCT/FI2021/050545, 6 pages.
Written Opinion of the ISA dated Nov. 15, 2021, for PCT/FI2021/050545, 9 pages.

* cited by examiner

METHOD AND ARRANGEMENT FOR WASHER SEAL CONTROL

This application is the U.S. national phase of International Application PCT/FI2021/050545, filed Aug. 6, 2021, which designated the U.S. and claims priority to Finnish Patent Application FI 20205788, filed Aug. 10, 2020, the entire contents of each of which are hereby incorporated by reference.

TECHNICAL FIELD

The present invention relates to a method and arrangement for washer seal control. In particular, but not exclusively, the present invention relates to control of seal bars of a drum displacement washer. In particular, but not exclusively, the present invention relates to control of seal bars of a drum displacement washer using distance sensors integrated with the drum.

BACKGROUND

In a drum displacement washer, the pulp to washed forms a cake on the surface ribs of a rotating drum and wash water is supplied to the cake in several phases. The surface of the drum is divided into different sections using seal bars installed in the axial direction of the drum and abutting towards the surface of the drum.

The position of the seal bar in relation to the surface of the drum is traditionally carried out prior to starting of the washer, often manually. The position of the seal bar has an effect on the efficacy of sealing, wear of the parts of the washer and energy consumption.

Automatic adjustment of seal position has been previously disclosed in patent publication U.S. Pat. No. 8,303,770 B2 in which force acting on the seal is measured and the position thereof is adjusted based on the measured force. The force sensors are placed outside the drum.

It is the object of the present invention to improve the efficiency of the washer by measuring the distance of the seal bars from the drum surface with an arrangement mitigating previous solutions.

SUMMARY

Various aspects of examples of the invention are set out in the claims.

According to a first example aspect of the present invention, there is provided an arrangement for measuring the distance between at least one seal bar and a rotating drum of a drum displacement washer, comprising
at least one sensor element positioned inside the rotating drum and configured to provide a signal indicative of the distance between the outer surface of the rotating drum and the at least one seal bar; and
a signal transfer element configured to transfer the signal outside the rotating drum.

The signal transfer element may comprise a slip ring at an end of the rotating drum and a wired connection thereto from the at least one sensor element.

The signal transfer element may comprise a wireless connection to the at least one sensor element.

The at least one sensor element may comprise a sensor selected from the group of inductive sensor, capacitive sensor, acoustic sensor, radiative sensor, optical sensor, magnetic sensor, electric sensor, pressure sensor, vibration sensor, eddy-current sensor, mechanical sensor and imaging sensor.

According to a second example aspect of the present invention, there is provided a method for adjusting the distance between at least one seal bar and a rotating drum of a drum displacement washer, comprising
measuring the distance between the at least on seal bar and the rotating drum with at least one sensor element positioned inside the rotating drum and configured to provide a signal indicative of the distance between the outer surface of the rotating drum and the at least one seal bar;
transferring the signal outside the rotating drum with a signal transfer element configured to transfer the signal outside the rotating drum determining a distance based on the signal; and
adjusting the distance between at least one seal bar and a rotating drum based on the determined distance.

According to a third example aspect of the present invention, there is provided a control system for adjusting the distance between at least one seal bar and a rotating drum of a drum displacement washer, comprising
a control element comprising at least one processor configured to cause the control system to carry out the method according to the second example aspect of the present invention;
at least one adjustment element configured to move the at least one seal bar in order to adjust the distance between the at least one seal bar and the rotating drum, wherein
the control system comprises an arrangement according to the first example aspect of the present invention.

According to a fourth example aspect of the present invention, there is provided a drum displacement washer, comprising
the arrangement according to the first example aspect of the present invention; and/or
the control system according to the third example aspect of the present invention.

According to a fifth example aspect of the present invention, there is provided a computer program comprising computer-executable program code that, when executed, causes the computer to execute a method according to the second example aspect of the present invention.

According to a sixth example aspect of the present invention, there is provided a non-transitory memory medium comprising the computer program according to the fifth example aspect of the present invention.

Any memory medium hereinbefore or hereinafter may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device. In the context of this document, a "memory medium" may be any non-transitory media or means that can contain, store, communicate, propagate or transport the instructions for use by or in connection with an instruction execution system, apparatus, or device, such as a computer.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Fora more complete understanding of example embodiments of the present invention, reference is now made to the following descriptions taken in connection with the accompanying drawings in which.

DETAILED DESCRIPTION OF THE DRAWINGS

Figure 1:
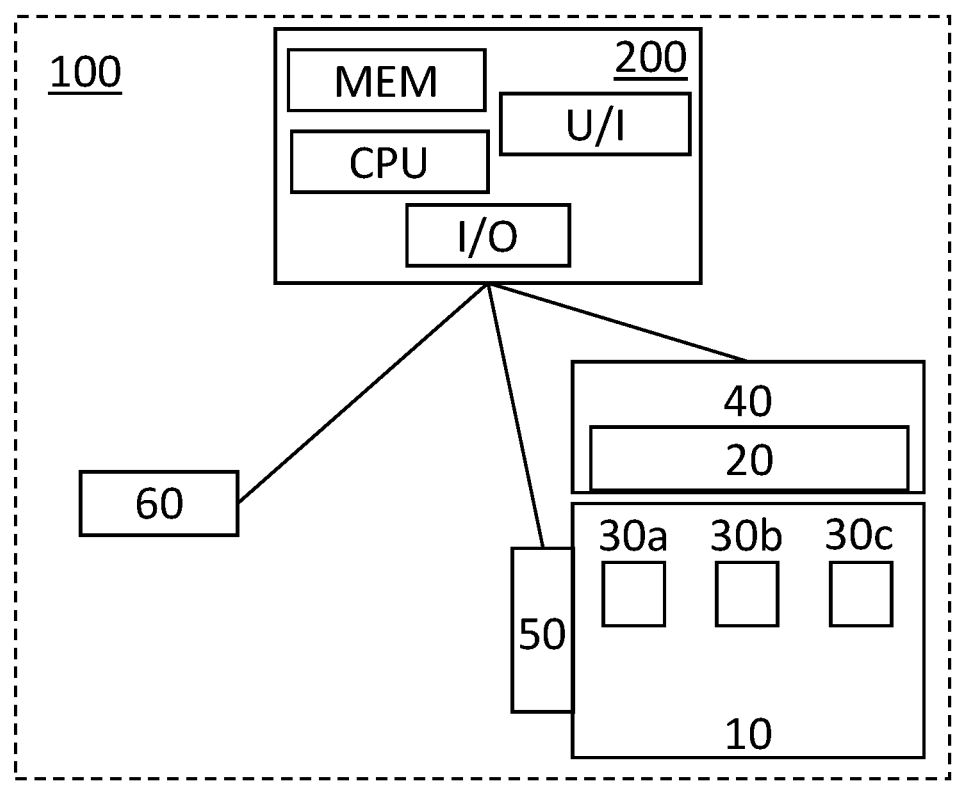
FIG. 1 shows a schematic block view of a washer according to an example embodiment of the invention.

FIG. 1 shows a schematic block view of a washer 100 according to an example embodiment of the invention, the washer 100 being a drum displacement washer. The washer 100 comprises a rotating drum 10 and at least one seal bar 20, The washer 100 further comprises an arrangement for measuring the distance between the at least one seal bar 20 and the rotating drum 10. While FIG. 1 shows a single seal bar 20, in an embodiment the washer 100 comprises for example 4 or 6 seal bars.

The washer further comprises an adjustment element 40 for actuating the seal bar 20. The adjustment element 40 is configured to move the at least one seal bar 20 in order to adjust the distance between the at least one seal bar and the rotating drum 10.

The arrangement for measuring comprises at least one sensor element 30a-c positioned inside the rotating drum 10 and configured to provide a signal indicative of the distance between the outer surface of the rotating drum 10 and the at least one seal bar. While FIG. 1 shows three sensor elements 30a-c, in an embodiment the washer 100 comprises at least one sensor element or for example 4 or 6 sensor elements.

The arrangement for measuring further comprises a signal transfer element 50 configured to transfer the signal from the at least one sensor element outside the drum 10. The signal transfer element 50 is connected to the at least one sensor element 30a-c with a wired or wireless connection. In an embodiment, the signal transfer element 50 is connected to the at least one sensor with a wired connection and comprises a slip ring and a wired connection thereto from the at least one sensor element 30a-c. In a further embodiment, the signal transfer element 50 is connected to the at least one sensor element 30a-c with a wireless connection, for example using wireless internet connection such as Wi-Fi or Bluetooth connection. In an embodiment with a wireless connection, the elements inside the rotating drum are powered by a battery, unit, for example a long-life battery unit.

The signal transfer element 50 is further connected to a control element 200 with a wired or wireless connection in a conventional manner. The control element 200 in an embodiment is comprised in the washer as a stand-alone control element. In a further embodiment, the control element is integrated with a larger system, such as a plant automation system. in a still further embodiment, the functionalities of the control element 200 reside in a remote service, such as a cloud service with which the signal transfer element 50 is connected.

The control element 200 comprises electronics configured to control the operations of the washer, to carry out calculations and to cause carrying out the steps of a method according to the invention. The control element 200, in an embodiment, comprises a memory and at least one processor. The processor is, in an embodiment, configured to control the washer 100 and to cause storing the data into the memory. The processor is further configured to cause controlling of the operation of the control element 200 and the washer 100 using a non-transitory computer program code stored in the memory.

In a further embodiment, the control element 200 comprises a communication unit comprising a wired or wireless connection to the signal transfer unit and, in an embodiment, to further control elements, to a plant automation system or to a remote service such as a cloud service.

In a further embodiment the control element 200 comprises a user interface unit comprising for example a display or a touch display for showing the measurement result or further information and for receiving user input. In a still further embodiment, the control element 200 comprises, or is comprised in, a personal electronic device such as a laptop computer, a tablet computer or a personal computer and configured to co-operate with the measurement arrangement. Furthermore, the control element 200 in an embodiment comprises further elements not shown in FIG. 1 such as a power source.

In an embodiment, the washer further comprises a rotation sensor 60 configured to detect the rotational speed of the rotating drum 10. The rotation sensor 60 is connected to the control element 200 with a wired or wireless connection. In a still further element, the washer comprises further sensors and/or transducers, which are in an embodiment connected with the control element 200.

Figure 2:
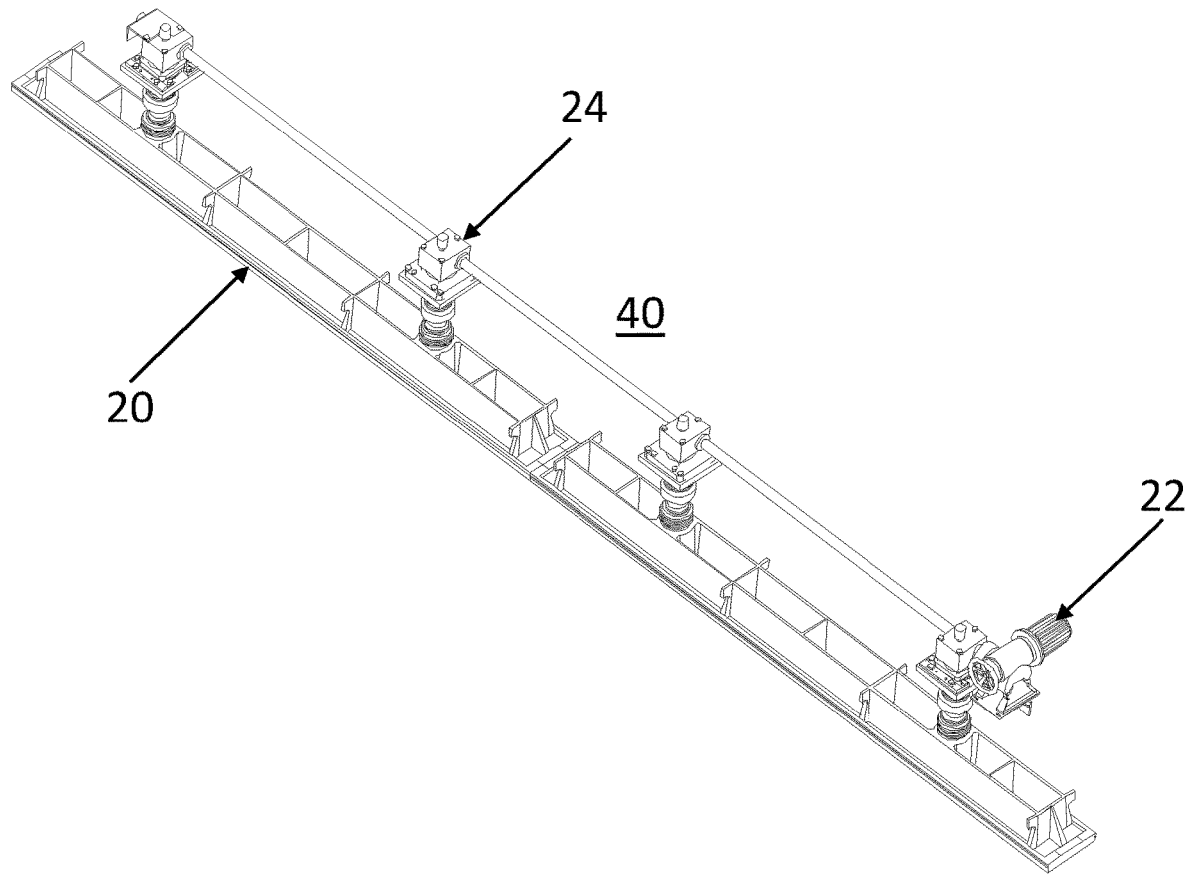
FIG. 2 shows a schematic view of a seal bar arrangement of a washer according to an example embodiment of the invention.

FIG. 2 shows a schematic view of a seal bar arrangement of a system according to an example embodiment of the invention. FIG. 2 shows the seal bar 20 that extends in the axial direction of the rotating drum 10 (not shown in FIG. 2) and abuts towards the surface thereof. The seal bar arrangement comprises the adjustment element 40 configured to move the at least one seal bar 20 in order to adjust the distance between the at least one seal bar 20 and the rotating drum 10.

The adjustment element 40, in an embodiment, comprises an actuator 22 and gear elements 24 for transferring the force from the actuator to the elements configured to move the seal bar. In an embodiment, the actuator 22 comprises a motor, for example an electric motor. In a further embodiment, the actuator 22 comprises a hydraulic arrangement or a pneumatic arrangement.

Figure 3:
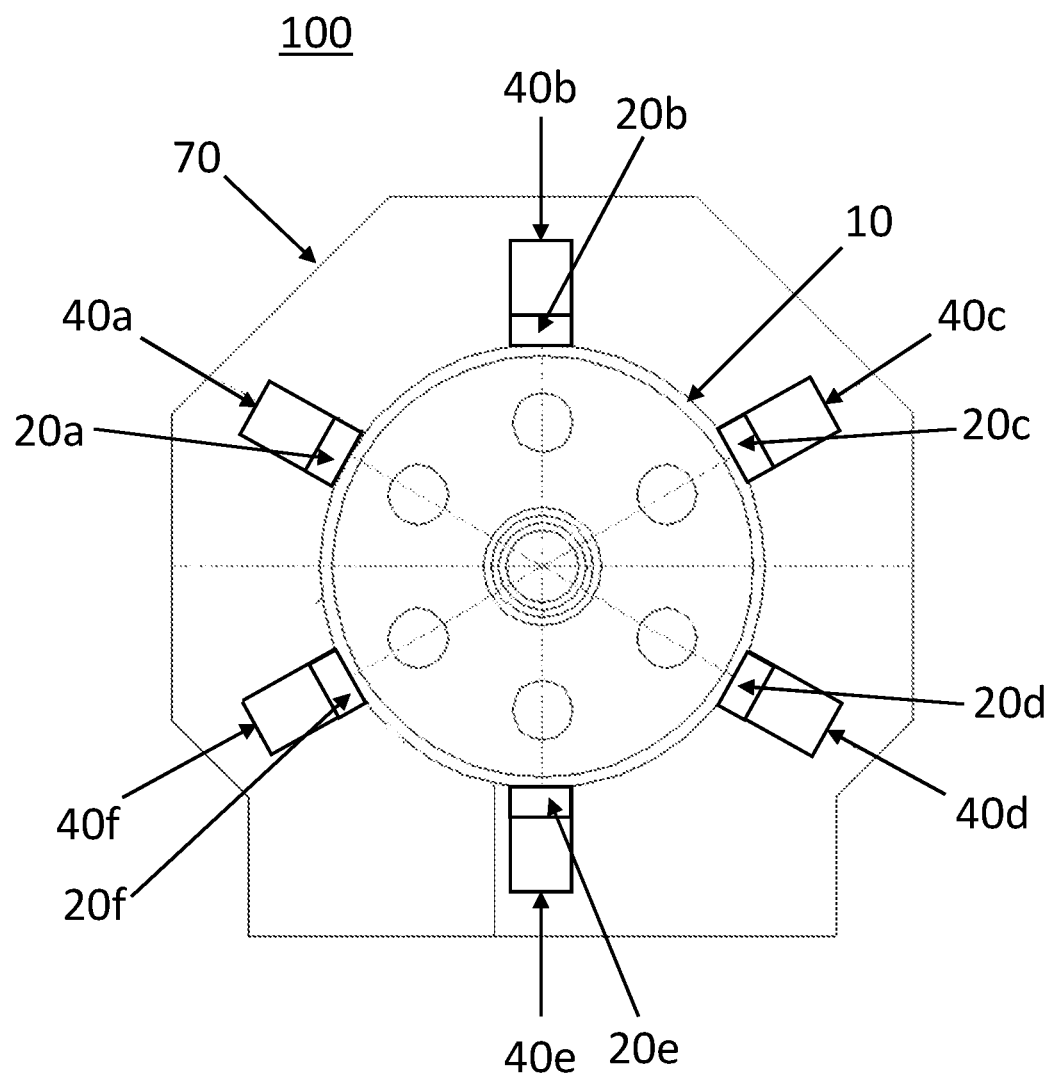
FIG. 3 shows a schematic cross-sectional view of a washer according to an example embodiment of the invention.

FIG. 3 shows a schematic cross-sectional view of a washer according to an example embodiment of the invention. FIG. 3 shows the rotating drum 10 and a frame, or casing, 70 of the washer. FIG. 3 further shows the adjustment elements 40a-f and the seal bars 20a-f. The seal bars 20a-f abut towards the surface of the rotating drum 10 thus affecting sealing a dividing the surface of the drum into different sections, or zones, for washing of the pulp. It is to be noted that although FIG. 3 shows six seal bars 20a-f, the number of seal bars in an embodiment is different, depending on the desired attributes of the drum displacement washer 100.

Figure 4:
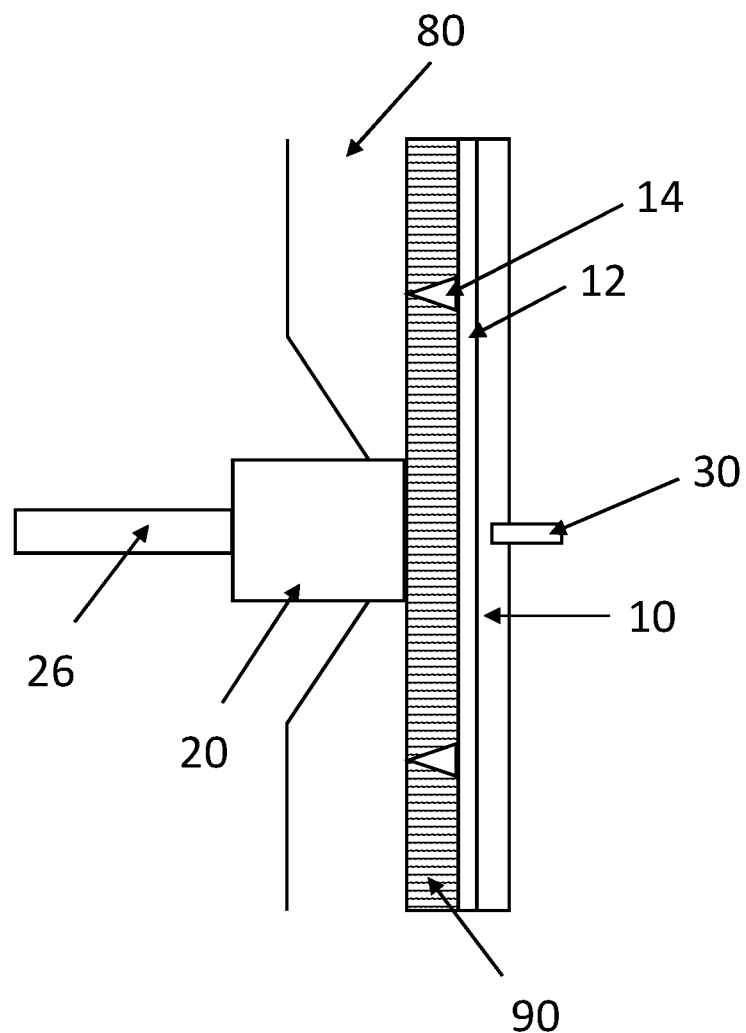
FIG. 4 shows a schematic view of a measurement arrangement according to an example embodiment of the invention.

FIG. 4 shows a schematic view of a measurement arrangement according to an example embodiment of the invention. FIG. 4 shows a section of the rotating drum 10, having on its surface dividing bars, or ribs, 14 and a perforated surface plate 12 on top of which a cake of pulp 90 is formed in operation. A skilled person appreciates that the section of the surface of the drum 10 is in reality curved although depicted as straight for purposes of illustration. FIG. 4 further shows the area 80 comprising wash water. At least one seal bar 20 abuts towards the pulp cake 90 and the surface of the drum and divides the surface into different sections, or zones.

If the seal bar 20 is too close to the surface of the drum 10, and the ribs 14, it will cause wear to the parts and cause the rotation of the drum to consume more energy due to increased torque required. On the other hand, if the seal bar 20 is too distant from the surface of the drum 10, and the ribs 14, the sealing effect will not be fully realized and the washing efficacy will be diminished. Accordingly, the distance between the drum surface and the seal bar 20 is measured and adjusted in accordance with the embodiments of the invention.

The adjusting of the distance is, in an embodiment, carried out by an adjustment bar 26 which in turn is actuated via the gear elements 24 by the actuator 22 (not shown in FIG. 4). A skilled person appreciates that a different type of known adjusting mechanism is used in further embodiments to move the seal bar in order to adjust the distance.

The measurement arrangement comprises at least one sensor element 30 configured to provide a signal indicative of the distance between the outer surface of the rotating drum 10 and the at least one seal bar. In an embodiment, the sensor element 30 resides on the inner surface of the drum 10 and is pointed in a direction perpendicular to the surface. In an embodiment, the sensor element provides a signal indicative of the distance to the seal bar such as a short pulse each time it passes a seal bar 20. In a further embodiment, the sensor element 30 provides a continuous signal indicative of the distance, such as a voltage indicative of the distance. The signal from the at least one sensor element is transferred outside the drum 10 via the signal transfer element 50 as hereinbefore described.

The at least one sensor element comprises a distance sensor, i.e. a sensor configured to provide a signal indicative of the distance to be measured. In an embodiment, the at least one sensor element comprises an inductive sensor. In a further embodiment, the sensor element comprises a sensor selected from the group of inductive sensor, capacitive sensor, acoustic sensor, radiative sensor, optical sensor, magnetic sensor, electric sensor, pressure sensor, vibration sensor, eddy-current sensor, mechanical sensor and imaging sensor. In a still further embodiment, the seal bar 20 comprises an element or material that is detected by the at least one sensor element 30 to provide a signal indicative of distance. The at least one sensor element 30 is positioned in the inside of the rotating drum 10 in such a way that it does not disturb the operation of the washer. In an embodiment, the at least one sensor element 30 is positioned at or near the inner surface of the rotating drum 10. In an embodiment, the sensor is protected with protective structures from the environment thereof.

The washer 100 in an embodiment comprises a plurality of sensor elements. In an embodiment, the plurality of sensor elements 30 is distributed in an axial direction of the drum 10, so that a signal indicative of distance is provided from different positions of the seal bar 20. In a still further embodiment, the plurality of sensor elements 30 is in addition to or instead of the distribution in axial direction distributed around the circumference of the drum, so that on each revolution of the drum several signals indicative of the distance of each seal bar are provided.

In an embodiment, a signal from the rotation sensor 60 (not shown in FIG. 4) is used in determining which sensor element 30 of the plurality of sensor elements is at which position. In a still further embodiment, the signal from the at least one sensor element 30 is used in determining the rotational speed of the drum 10 in addition to the distance.

Figure 5:
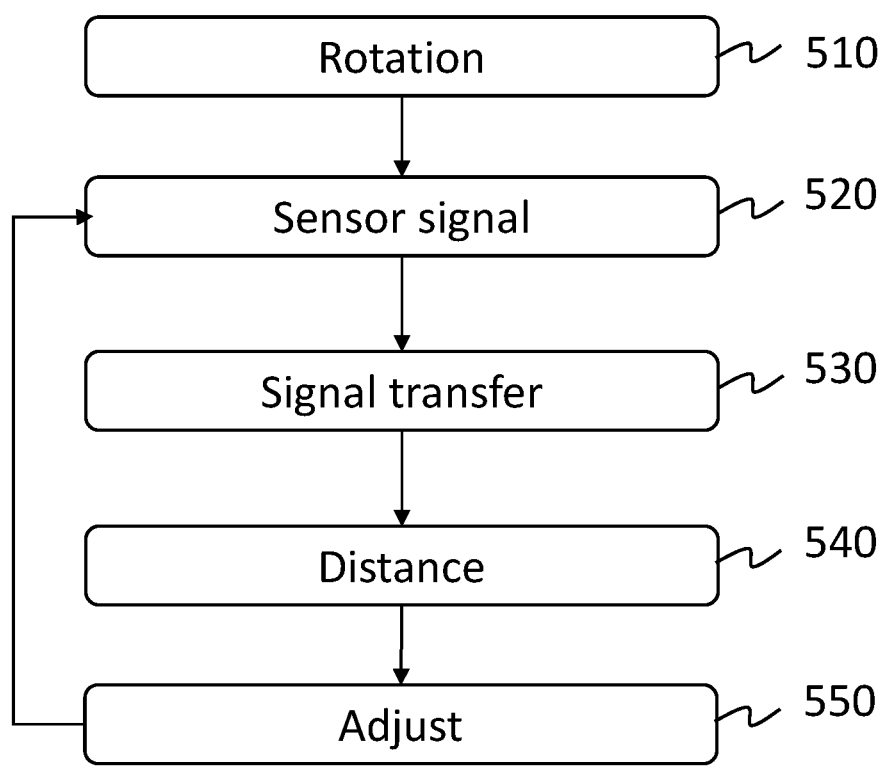
FIG. 5 shows a flow chart of a method according to an example embodiment of the invention.

FIG. 5 shows a flow chart of a method according to an example embodiment of the invention. The method is caused to be carried out by the control element 200, i.e. the processor of the control element causes the method to be carried out. At step 510 the washer is in operation and the rotating drum 10 rotates. At step 520 a signal indicative of the distance between at least one seal bar 20 and the rotating drum 10 is provided by at least one sensor element 30. At step 530 the signal is transferred outside of the rotating drum 10 with a signal transfer element 50 and to the control element 200. At step 540 the distance between at least one seal bar 20 and the rotating drum 10 is determined. At step 550, the distance between at least one seal bar 20 and the rotating drum 10 is adjusted using the adjustment element 40, if it is decided that the distance needs to be adjusted. The skilled person appreciates that a common control system is used for such a decision. The steps 520 to 550 are repeated as needed.

Without in any way limiting the scope, interpretation, or application of the claims appearing below, a technical effect of one or more of the example embodiments disclosed herein is easier start-up of the washer as the seal bars need not be manually adjusted. Another technical effect of one or more of the example embodiments disclosed herein is lower chemical consumption and evaporation costs due to improved sealing effect. Another technical effect of one or more of the example embodiments disclosed herein is lower wearing of components, especially of the drum ribs and the seal bar. A still further technical effect of one or more of the example embodiments disclosed herein is lower energy consumption. A still further technical effect of one or more of the example embodiments disclosed herein is easier positioning of the seal bar in assembly and/or maintenance of the washer.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, with examples of a suited apparatus being described and depicted hereinbefore. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

The invention claimed is:

1. An arrangement for measuring a distance between at least one seal bar and an outer surface of a rotating drum of a drum displacement washer, the arrangement comprising:
   at least one sensor element inside the rotating drum and configured to provide a signal indicative of the distance between the outer surface of the rotating drum and the at least one seal bar; and
   a signal transfer element configured to transfer the signal outside the rotating drum.

2. The arrangement according to claim 1, wherein the signal transfer element comprises a slip ring at an end of the rotating drum and a wired connection between the slip ring and the at least one sensor element.

3. The arrangement according to claim 1, wherein the signal transfer element comprises a wireless communication path between the at least one sensor element and a control element outside of the rotating drum.

4. The arrangement according to claim 1, wherein the at least one sensor element comprises at least one sensor selected from the group of: an inductive sensor, a capacitive sensor, an acoustic sensor, a radiative sensor, an optical sensor, a magnetic sensor, an electric sensor, a pressure sensor, a vibration sensor, an eddy-current sensor, a mechanical sensor and an imaging sensor.

5. A method for adjusting a distance between at least one seal bar and a rotating drum of a drum displacement washer, the method comprising sensing the distance between the at least one seal bar and the rotating drum with at least one sensor element positioned inside the rotating drum;
generating, by the at least one sensor element, a signal indicative of the distance between the rotating drum and the at least one seal bar;
transferring the signal outside the rotating drum by a signal transfer element configured to transfer the signal outside the rotating drum;
determining a sensed distance between the rotating drum and the at least one seal bar based on the signal; and
adjusting the distance between at least one seal bar and the rotating drum based on the sensed distance.

6. A drum displacement washer comprising:
   a casing;
   a rotating drum within the casing;
   ribs on an outer surface of the rotating drum;
   a wash water region within the casing and external to the rotating drum;
   an array of seal bars within the casing, extending around the rotating drum, and facing and adjacent to the ribs on the outer surface of the rotating drum;
   an array of adjustment elements with the casing and configure to adjust positions of the seal bars of the array of seal bars relative to the rotating drum;
   a sensor element within the rotating drum and configured to generate a signal indicative of a distance between the outer surface of the rotating drum and at least one seal bar of the array of seal bars;
   a signal transfer element configured to transfer the signal to outside the rotating drum to a control element, and
   a control element configured to:
      receive from the signal transfer element the signal indicative of the distance between the outer surface of the rotating drum and the at least one seal bar;
      determine a sensed distance between the at least one seal bar and the rotating drum based on the signal; and
      actuate the array of adjustment elements to adjust the positions of the seal bars relative to the rotating drum based on the sensed distance during the rotation of the rotating drum.

* * * * *